(12) United States Patent
Kobayashi

(10) Patent No.: US 11,232,806 B2
(45) Date of Patent: Jan. 25, 2022

(54) VOICE COMMUNICATION DEVICE, VOICE COMMUNICATION METHOD, AND PROGRAM

(71) Applicant: NIPPON TELEGRAPH AND TELEPHONE CORPORATION, Chiyoda-ku (JP)

(72) Inventor: Kazunori Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/652,199

(22) PCT Filed: Nov. 13, 2018

(86) PCT No.: PCT/JP2018/041945
§ 371 (c)(1),
(2) Date: Mar. 30, 2020

(87) PCT Pub. No.: WO2019/098178
PCT Pub. Date: May 23, 2019

(65) Prior Publication Data
US 2020/0251121 A1    Aug. 6, 2020

(30) Foreign Application Priority Data

Nov. 14, 2017 (JP) .............................. JP2017-218825

(51) Int. Cl.
*G10L 21/0208* (2013.01)
*G10K 11/178* (2006.01)
(Continued)

(52) U.S. Cl.
CPC ..... *G10L 21/0208* (2013.01); *G10K 11/17854* (2018.01); *G10K 2210/108* (2013.01); *G10K 2210/505* (2013.01)

(58) Field of Classification Search
CPC ........ H04M 9/082; H04M 9/08; H04M 3/002; H04M 3/568; H04M 1/72591; H04M 1/60;
(Continued)

(56) References Cited

U.S. PATENT DOCUMENTS 5,793,864 A * 8/1998 Ramsden .............. H04M 3/323
379/24

FOREIGN PATENT DOCUMENTS

JP      5-241582 A     9/1993
JP      05241582 A  *  9/1993
(Continued)

OTHER PUBLICATIONS

International Search Report dated Jan. 29, 2019 in PCT/JP2018/041945 filed Nov. 13, 2018, 2 pages.

*Primary Examiner* — Leshui Zhang
(74) *Attorney, Agent, or Firm* — Oblon, McClelland, Maier & Neustadt, L.L.P.

(57) ABSTRACT

A voice communication technique by which superior echo canceling can be realized even in use of non-directional microphones is provided. When voice uttered by a near end speaker is defined as speaker's voice; sound obtained by emitting a received speech signal, which is a voice signal of a far end speaker, by a loudspeaker is defined as reproduction sound; a signal obtained by picking up an acoustic signal, which contains the speaker's voice and the reproduction sound, by a first microphone is defined as a first sound pickup signal; and a signal obtained by picking up an acoustic signal, which contains the speaker's voice and the reproduction sound, by a second microphone is defined as a second sound pickup signal, a voice communication device includes: a first subtraction unit that generates a first-subtracted first sound pickup signal that is a difference between a corrected sound pickup signal and the second
(Continued)

sound pickup signal or the first sound pickup signal, the corrected sound pickup signal being obtained by correcting either one of the first sound pickup signal and the second sound pickup signal on the basis of an amplitude difference based on a difference between a distance d1 from the loudspeaker to the first microphone and a distance d2 from the loudspeaker to the second microphone (d2≤d1); and a second subtraction unit that generates a transmitted speech signal, which is to be transmitted to the far end speaker, by subtracting an adaptive-filtered second sound pickup signal, which is obtained by canceling echo, from the first-subtracted first sound pickup signal.

9 Claims, 12 Drawing Sheets

(51) Int. Cl.
*H04R 3/02* (2006.01)
*H04R 1/40* (2006.01)
*H04M 9/08* (2006.01)
*H04B 3/23* (2006.01)
*H04M 1/60* (2006.01)

(58) Field of Classification Search
CPC .......... H04R 3/02; H04R 3/002; H04R 3/005; H04R 2499/11; H04R 2499/13; H04R 2499/15; H04R 2430/03; H04R 1/1083; H04R 1/1091; H04R 1/406; H04R 27/00; H04R 2227/005; H04R 1/40; H04B 3/23; H04B 3/20; H04B 3/234; H04B 3/235; G10L 2021/02082; G10L 2021/02166; G10L 2021/02165; G10L 21/0208; G10L 21/0216; G10L 21/0232; G10L 19/012; G10L 19/00; G10L 15/20; G10L 21/02–0388; G10K 11/16; G10K 11/175; G10K 2210/505; G10K 2210/1081; G10K 11/002; G10K 11/346; G10K 11/178–17885; G10K 2210/30; G10K 2210/3012–30232; G10K 2210/3025; G10K 2210/3026; G10K 2210/3028; G10K 2210/30281; G10K 2210/3035; G10K 2210/30351; G10K 2210/506; G10K 11/17854; G10K 2210/108; H03G 3/20; H03G 5/165; H03G 9/025; H03F 2200/03

USPC .......... 704/226, E19.014, E21.002, E21.004, 704/E21.007; 381/17, 18, 19, 20, 21, 381/300, 301, 302, 303, 307, 119, 66, 27, 381/71.1–71.6, 71.9, 71.11, 71.12, 26, 381/318, 86, 92, 94.1, 93, 95, 96, 122, 381/123; 455/569.1, 570; 379/406.01–406.16; 700/94

See application file for complete search history.

(56) References Cited

FOREIGN PATENT DOCUMENTS

| JP | 8-223274 A | | 8/1996 |
|---|---|---|---|
| JP | 10-242891 A | | 9/1998 |
| JP | 2006-135886 A | | 5/2006 |
| JP | 2006135886 A | * | 5/2006 |
| JP | 2007-336132 A | | 12/2007 |
| JP | 2007336132 A | * | 12/2007 |
| JP | 2011-160429 A | | 8/2011 |
| JP | 2017-191987 A | | 10/2017 |

* cited by examiner

VOICE COMMUNICATION DEVICE, VOICE COMMUNICATION METHOD, AND PROGRAM

TECHNICAL FIELD

The present invention relates to an echo canceling technique for canceling echo which is sound sneaking from a loudspeaker to a microphone in hands-free call.

BACKGROUND ART

A device that cancels echo (acoustic echo) which is sound sneaking from a loudspeaker to a microphone in hands-free call such as a TV conference and a voice conference is called an echo canceling device. FIG. 16 illustrates the configuration of a voice communication device 800 which includes an echo canceling device 805 of related art and is disclosed in Patent Literature 1. As illustrated in FIG. 16, the echo canceling device 805 includes a subtraction unit 820, an addition unit 830, a first adaptive filter 840, and a second adaptive filter 850. The configuration obtained by adding a loudspeaker 890, a main microphone 892, and a sub-microphone 894 to the echo canceling device 800 is the voice communication device 800. The echo canceling device 805 is connected to the main microphone 892 and the sub-microphone 894. The main microphone 892 is disposed so as to pick up voice of a near end speaker 10 as much as possible and to pick up sound from the loudspeaker 890 as little as possible. The sub-microphone 894 is disposed so as to pick up sound from the loudspeaker 890 as much as possible and to pick up voice of the near end speaker 10 as little as possible. The main microphone 892 and the sub-microphone 894 are respectively realized by a directional microphone facing in a speaker's direction and a directional microphone facing in a loudspeaker's direction. The echo canceling device 805 cancels echo by using two adaptive filters that are the first adaptive filter 840 for processing a sound pickup signal obtained by the sub-microphone 894 and the second adaptive filter 850 for processing a received speech signal which is before being outputted from the loudspeaker (that is, a voice signal of a far end speaker (not shown) transmitted via a network 900). Accordingly, echo as well as distortion components of loudspeaker sound can be canceled, and high performance hands-free call can be realized even if a casing of the voice communication device 800 is small in size.

PRIOR ART LITERATURE

Patent Literature

Patent Literature 1: Japanese Patent Application Laid Open No. 2011-160429

SUMMARY OF THE INVENTION

Problems to be Solved by the Invention

However, a directional microphone used in the configuration of the voice communication device 800 is expensive compared to a non-directional microphone. Further, many sound holes are required for incorporating directional microphones in the casing of the voice communication device 800, causing large restriction in design.

Therefore, an object of the present invention is to provide a voice communication technique for making it possible to realize superior echo canceling even in use of non-directional microphones.

Means to Solve the Problems

An aspect of the present invention includes: a loudspeaker that emits a received speech signal, which is a voice signal of a far end speaker; a first microphone that picks up an acoustic signal, which contains speaker's voice which is voice uttered by a near end speaker and reproduction sound which is obtained by emitting the received speech signal, as a first sound pickup signal; a second microphone that picks up an acoustic signal, which contains the speaker's voice and the reproduction sound, as a second sound pickup signal; a correction unit that generates a corrected sound pickup signal, which is a signal obtained by correcting an amplitude difference based on a difference between a distance d1 from the loudspeaker to the first microphone and a distance d2 from the loudspeaker to the second microphone (here, d2≤d1), from either one of the first sound pickup signal and the second sound pickup signal; a first subtraction unit that generates a first-subtracted first sound pickup signal, which is a signal obtained by subtracting the second sound pickup signal from the corrected sound pickup signal or a signal obtained by subtracting the corrected sound pickup signal from the first sound pickup signal; an adaptive filter that generates an adaptive-filtered second sound pickup signal by canceling echo which varies over time, from the second sound pickup signal and a transmitted speech signal which is to be transmitted to the far end speaker; and a second subtraction unit that generates a signal, which is obtained by subtracting the adaptive-filtered second sound pickup signal from the first-subtracted first sound pickup signal, as the transmitted speech signal.

Effects of the Invention

The present invention enables voice communication which realizes superior echo cancellation even in use of non-directional microphones.

DETAILED DESCRIPTION OF THE EMBODIMENTS

Figure 1:
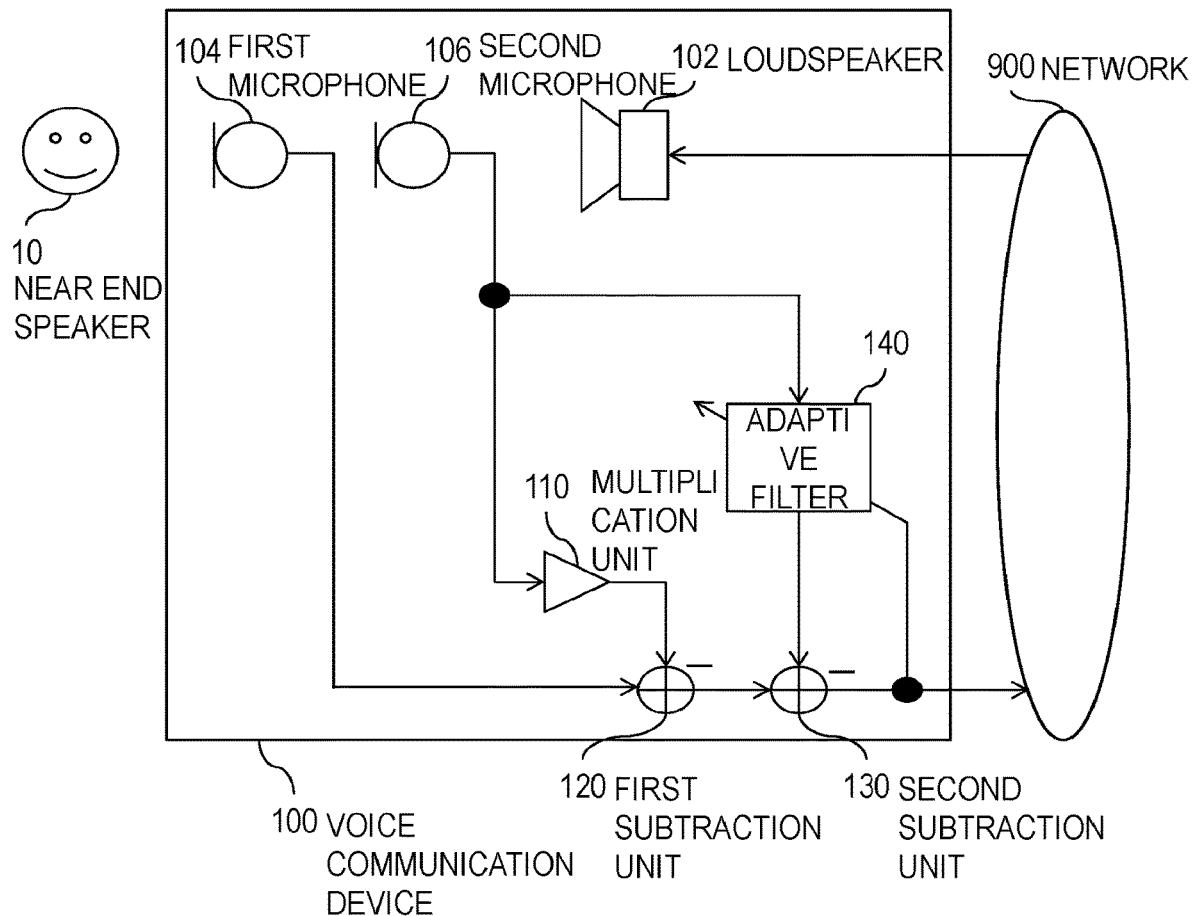
FIG. 1 is a block diagram illustrating an example of a configuration of a voice communication device 100.

Embodiments according to the present invention are described in detail below. Components having the mutually-same functions are given the same reference numerals and duplicate description thereof is omitted.

First Embodiment

Figure 2:
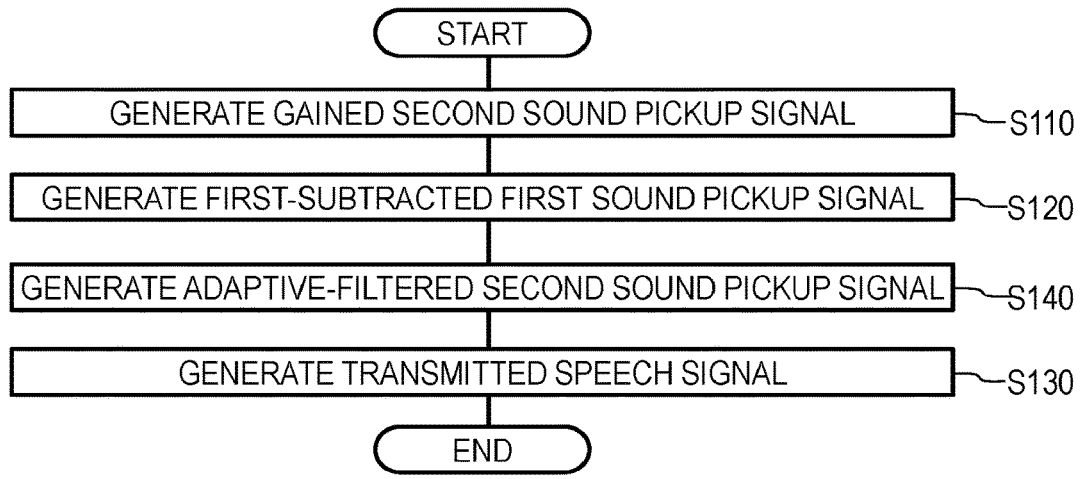
FIG. 2 is a flowchart illustrating an example of an operation of the voice communication device 100.

A voice communication device 100 is described below with reference to FIG. 1 and FIG. 2. FIG. 1 is a block diagram illustrating the configuration of the voice communication device 100. FIG. 2 is a flowchart illustrating an operation of the voice communication device 100. As illustrated in FIG. 1, the voice communication device 100 includes a loudspeaker 102, a first microphone 104, a second microphone 106, a multiplication unit 110, a first subtraction unit 120, a second subtraction unit 130, and an adaptive filter 140.

The loudspeaker 102 emits a voice signal (hereinafter, referred to as a received speech signal) of a far end speaker (not shown) which is transmitted via a network 900. A near end speaker 10 arbitrarily utters. Voice uttered by the near end speaker 10 is referred to as speaker's voice.

The first microphone 104 is disposed on a position farther from the loudspeaker 102 than the second microphone 106. That is, the second microphone 106 is disposed on a position closer to the loudspeaker 102 than the first microphone 104. The first microphone 104 and the second microphone 106 may be non-directional microphones. The loudspeaker 102, the first microphone 104, and the second microphone 106 are housed in a casing of the voice communication device 100. For example, a distance between the loudspeaker 102 and the first microphone 104 may be approximately 30 mm, a distance between the loudspeaker 102 and the second microphone 106 may be approximately 10 mm, and the size of the casing of the voice communication device 100 may be relatively small such as approximately 80 mm×40 mm.

The voice communication device 100 outputs a transmitted speech signal which is to be transmitted to a far end speaker. The transmitted speech signal is transmitted to the far end speaker via the network 900.

An operation of the voice communication device 100 is described below with reference to FIG. 2. The multiplication unit 110 generates a signal by multiplying a sound pickup signal picked up by the second microphone 106 (referred to below as a second sound pickup signal) by a predetermined fixed coefficient (referred to below as a gained second sound pickup signal) (S110). The second sound pickup signal is a signal obtained by picking up speaker's voice and reproduction sound which is obtained by emitting a received speech signal, for example. A method for determining a fixed coefficient is described later.

The first subtraction unit 120 generates a signal by subtracting the gained second sound pickup signal from a sound pickup signal picked up by the first microphone 104 (referred to below as a first sound pickup signal) (referred to below as a first-subtracted first sound pickup signal) (S120). The first sound pickup signal is also a signal obtained by picking up speaker's voice, reproduction sound, and the like, as is the case with the second sound pickup signal. Through S120, echo components contained in the first sound pickup signal are canceled and a signal containing less echo components (that is, the first-subtracted first sound pickup signal) is obtained.

The adaptive filter 140 generates an adaptive-filtered second sound pickup signal by canceling echo which varies over time, from the second sound pickup signal and a transmitted speech signal (S140). In other words, the adaptive filter 140 generates an adaptive-filtered second sound pickup signal, which is obtained by canceling echo from a transmitted speech signal, by using the second sound pickup signal as an input. Echo components contain reproduction sound components remaining due to influences of variation in microphone characteristics, characteristics of the casing of the voice communication device 100, echo characteristics of a room in which the voice communication device 100 is used, and the like. That is, the adaptive filter 140 is used for canceling echo caused by influences of room echo characteristics and the like which cannot be considered in advance. In order to handle echo varying over time, a filter coefficient set in the adaptive filter 140 is updated in sequence. A method for updating a filter coefficient (adaptive algorithm) is described later.

In order to also cancel distortion components generated in the loudspeaker 102, the processing of S140 is executed by using the second sound pickup signal obtained by picking up reproduction sound containing the distortion by the second microphone 106 disposed closer to the loudspeaker 102.

The second subtraction unit 130 generates a signal as a transmitted speech signal by subtracting the adaptive-filtered second sound pickup signal from the first-subtracted first sound pickup signal (S130).

Fixed Coefficient

A fixed coefficient is now described. Amplitude of a voice signal uniformly emitted to free space is decreased in inverse proportion to distance. When a distance from the loudspeaker 102 to the second microphone 106 is denoted as d2 and a distance from the loudspeaker 102 to the first microphone 104 is denoted as d1 (here, d2≤d1), the following relation is established between amplitude P1 of sound observed in the first microphone 104 and amplitude P2 of sound observed in the second microphone 106.

$$P1 = (d2/d1) \cdot P2 \tag{1}$$

With this relation, sound which directly reaches the first microphone 104 from the loudspeaker 102 is estimated and subtraction is performed. Specifically, a value calculated based on disposition of the microphones, that is, a ratio d2/d1 between the distance d2 from the loudspeaker 102 to the second microphone 106 and the distance d1 from the loudspeaker 102 to the first microphone 104 is set to a fixed coefficient, and a signal obtained by multiplying the second sound pickup signal by the fixed coefficient d2/d1 (the gained second sound pickup signal) is subtracted from the first sound pickup signal.

Here, the second sound pickup signal picked up by the second microphone 106 is expected to contain reproduction sound from the loudspeaker 102 as a main component.

Here, instead of simply using the ratio d2/d1 between two distances, a value at which echo outputted from the first subtraction unit 120 becomes minimum may be experimentally obtained and the value may be used as a fixed coefficient.

Positional Relation Among Loudspeaker and Two Microphones

Figure 3A:
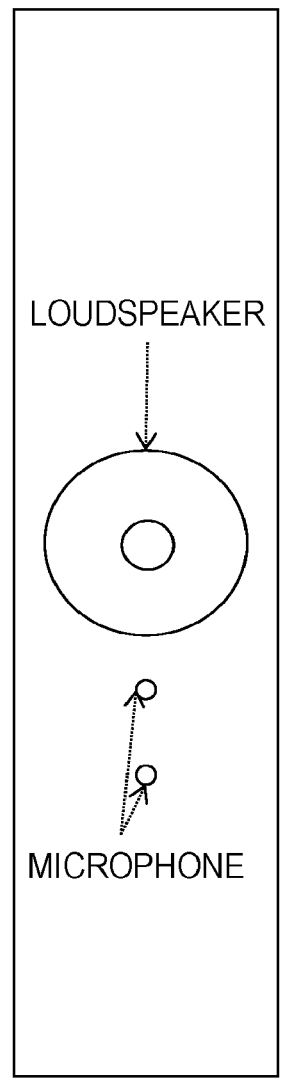
FIG. 3A is a diagram illustrating an example of a positional relation among a loudspeaker and microphones.
Figure 3B:
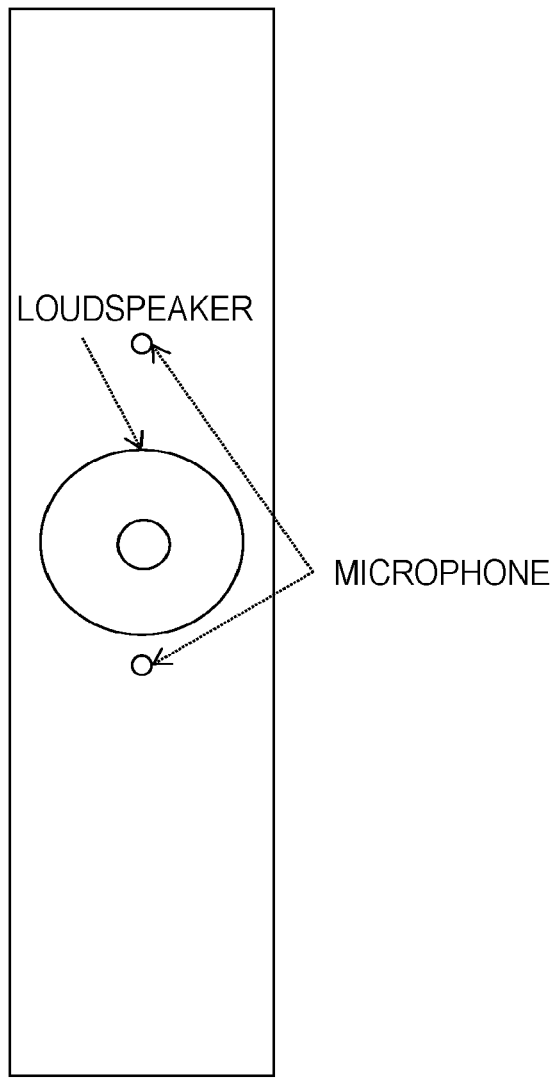
FIG. 3B is a diagram illustrating an example of a positional relation among a loudspeaker and microphones.
Figure 3C:
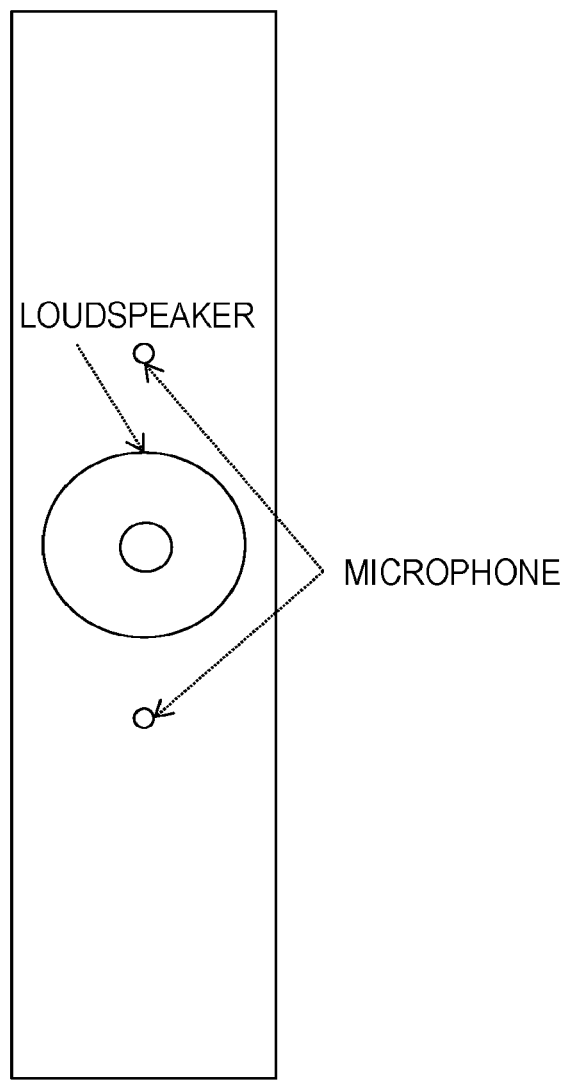
FIG. 3C is a diagram illustrating an example of a positional relation among a loudspeaker and microphones.
Figure 3D:
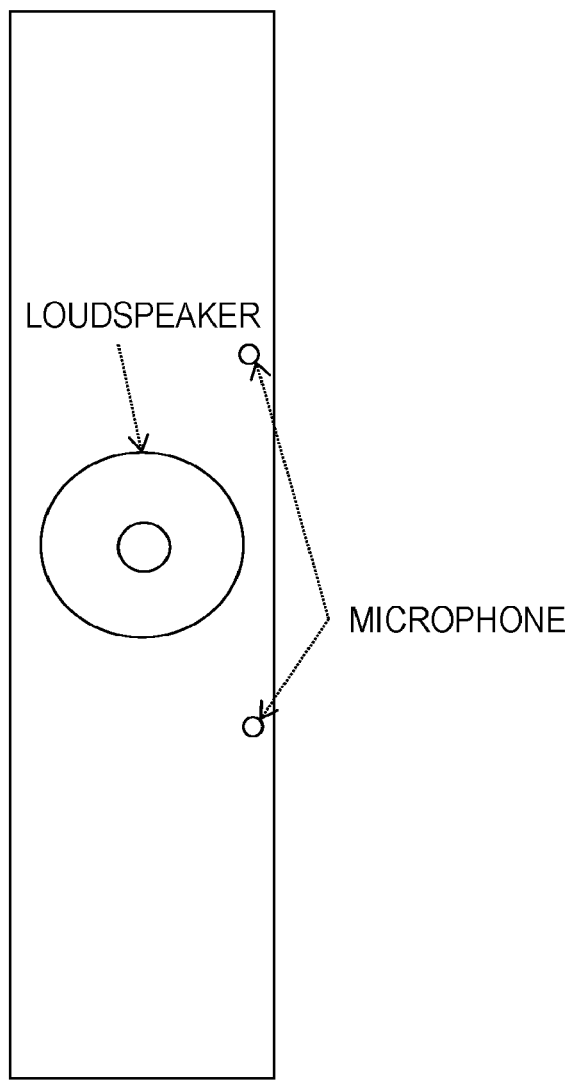
FIG. 3D is a diagram illustrating an example of a positional relation among a loudspeaker and microphones.

In the above description, it is only required that the second microphone 106 is positioned closer to the loudspeaker 102 than the first microphone 104. FIG. 3A, FIG. 3B, FIG. 3C, and FIG. 3D illustrate examples of a positional relation among a loudspeaker and microphones. FIG. 3A illustrates a positional relation in which microphones are positioned only on one side of a loudspeaker, but a loudspeaker may be positioned between two microphones as illustrated in FIG. 3B. Further, a loudspeaker may be disposed in substantially equal distances from two microphones as illustrated in FIG. 3C. Further, as illustrated in FIG. 3D, unequal disposition in the horizontal direction (on the corresponding drawing) may be employed.

Adaptive Algorithm

An adaptive algorithm for sequentially updating a filter coefficient is used in the adaptive filter. There are a normalized least mean squares (NLMS) algorithm, a least mean squares (LMS) algorithm, and the like, as typical adaptive algorithms. A filter coefficient is updated by using a received speech signal $x(t)$ from a far end speaker and a transmitted speech signal $e(t)$ to the far end speaker, for example. The NLMS algorithm and the LMS algorithm are simply described below (see Patent Literature 1).

NLMS Algorithm

The NLMS algorithm is an algorithm for updating a filter coefficient by only using the transmitted speech signal $e(t)$ of one latest observed sample and is characterized by a small amount of computation. A formula for updating a filter coefficient is expressed by the following two formulas.

$$H_1(t+1)=H_1(t)+a_1 \cdot X(t) \cdot e(t)/\{X(t)^T X(t)+\Sigma_{i=2}^M Y_i(t)^T Y_i(t)\}$$

$$H_m(t+1)=H_m(t)+a_m \cdot Y_m(t) \cdot e(t)/\{X(t)^T X(t)+\Sigma_{i=2}^M Y_i(t)^T Y_i(t)\}$$

Here, $H_1(t)$ and $H_m(t)$ (m=2, ..., M; M is an integer which is 2 or greater and denotes the number of microphones) denote vectors of a filter coefficient with respect to the received speech signal $x(t)$ at time t and are expressed as $H_m(t)=(h_m(t,0), ..., h_m(t,L-1))^T$ (m=1, ..., M), in which L denotes the number of taps. $a_1$ and $a_m$ (m=2, ..., M) denote preset step sizes of the NLMS algorithm and satisfy $0<a_1<2$ and $0<a_m<2$. Further, $X(t)$ denotes a vector of the received speech signal $x(t)$ for L samples at time t and is expressed as $X(t)=(x(t-0), ..., x(t-L+1))^T$. $Y(t)$ denotes a vector of a received sound signal $y(t)$ for L samples at time t and is expressed as $Y_m(t)=(y_m(t-0), ..., y_m(t-L+1))^T$ (the received sound signal $y_m(t)$ is a voice signal picked up by a microphone m).

LMS Algorithm

The LMS algorithm is also an algorithm for updating a filter coefficient by only using a transmitted speech signal $e(t)$ of one latest observed sample and is characterized by a small amount of computation, as is the case with the NLMS algorithm. An updating formula of the LMS algorithm can be expressed by the following two formulas.

$$H_1(t+1)=H_1(t)+b_1 \cdot X(t) \cdot e(t)$$

$$H_m(t+1)=H_m(t)+b_m \cdot Y_m(t) \cdot e(t)$$

Here, $b_1$ and $b_m$ (m=2, ..., M) denote preset step sizes of the LMS algorithm.

If learning of an adaptive filter for updating a filter coefficient is performed in a double-talk state in which voice of a near end speaker (speaker's voice) is uttered at the same time that a voice signal of a far end speaker (received speech signal) is outputted from a loudspeaker, the filter coefficient may be updated so as to also cancel the voice of the near end speaker (speaker's voice). In order to prevent this, it is focused that a voice signal of a far end speaker (received speech signal) outputted from a loudspeaker is attenuated in an output signal of the second subtraction unit 130 (transmitted speech signal). Power of an output signal of the second microphone 106 (second sound pickup signal) is compared with power of an output signal of the second subtraction unit 130 (transmitted speech signal). When the power of the output signal of the second subtraction unit 130 (transmitted speech signal) is sufficiently smaller than the power of the output signal of the second microphone 106 (second sound pickup signal), an adaptive filter is learned (that is, the filter coefficient of the adaptive filter is updated). Being sufficiently small means approximately 0.5 to 0.1 times of magnitude, for example. That is, it means that a ratio Pow1/Pow2 between the power Pow1 of an output signal of the second subtraction unit 130 (transmitted speech signal) and the power Pow2 of an output signal of the second microphone 106 (second sound pickup signal) is equal to or smaller than a threshold value or is smaller than the threshold value when the threshold value is set to a predetermined real number (a certain real number from 0.1 to 0.5 inclusive, for example). Here, the state that the ratio Pow1/Pow2 is equal to or smaller than a threshold value or is smaller than the threshold value means a state that the ratio Pow1/Pow2 is within a predetermined range representing that the ratio Pow1/Pow2 is small.

Alternatively, the adaptive algorithm described in Reference Patent Literature 1 (referred to below as a modified affine projection algorithm) may be used.

(Reference Patent Literature 1: Japanese Patent Application Laid Open No. 2006-135886)

It is assumed that the echo canceling device has a simulated echo path having a simulation characteristic h'*(k) (k denotes the number of steps representing discrete time of predetermined intervals) of a vector h* (** denotes a vector, hereinafter) having the length L and having an impulse response of an echo path between the loudspeaker and the microphone as an element. Here, the simulation characteristic h'*(k) corresponds to a filter coefficient. A formula for updating the simulation characteristic h'*(k) is expressed by the following formula.

$$h'_*(k) = h'_*(k-1) +$$

$$\mu(k)\psi\left(\sqrt{e_*^T(k)[X_*^T(k)X_*(k)]^{-1}e_*(k)}\right)\frac{X_*(k)[X_*^T(k)X_*(k)]^{-1}e_*(k)}{\sqrt{e_*^T(k)[X_*^T(k)X_*(k)]^{-1}e_*(k)}}$$

Here, x(k) denotes a received speech signal from a far end speaker, $x^*(k)=(x(k), x(k-1), \ldots, x(k-L+1))^T$, $X^*(k)=(x^*(k), x^*(k-1), \ldots, x^*(k-p+1))^T$, μ(k) denotes a fixed or time-variant update adjustment coefficient (0<μ(k)<2), e(k) denotes a transmitted speech signal to the far end speaker, and e*(k) denotes an error signal vector expressed by the following formula.

$$e_*(k) = \begin{bmatrix} e(k) \\ (1-\mu(k-1))e(k-1) \\ \ldots \\ (1-\mu(k-1))\times\ldots\times(1-\mu(k-p+1))e(k-p-1) \end{bmatrix}$$

Further, the limiter function ψ(a) is an arbitrary function having a characteristic for suppressing a value thereof as an input value a is increased.

In the modified affine projection algorithm, an upper limit value of the limiter function ψ(a) is set to a value which is smaller than 1 and learning of an adaptive filter is slowed down in a segment containing many voice components of a near end speaker. That is, it means that the upper limit value of the limiter function ψ(a) is equal to or smaller than a threshold value or is smaller than the threshold value when the threshold value is set to a predetermined real number (a real number from 0.1 to 0.5 inclusive, for example). Here, the state that the upper limit value of the limiter function ψ(a) is equal to or smaller than a threshold value or is smaller than the threshold value means a state that the upper limit value of the limiter function ψ(a) is within a predetermined range representing that the upper limit value is small.

The upper limit value of the limiter function ψ(a) is set to a smaller value than a predetermined value and a filter coefficient is updated by the modified affine projection algorithm, being able to prevent voice of a near end speaker (speaker's voice) from being canceled.

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

In the embodiment of the present invention, a fixed coefficient is set with preliminarily-known information (ratio d2/d1), being able to cancel echo from an initial state. Further, use of an adaptive filter makes it possible to further cancel reproduction sound components remaining due to influences of variation in microphone characteristics, characteristics of the casing of the voice communication device, echo characteristics of a room in which the voice communication device is used, and the like. Accordingly, echo can be stably canceled even with large variation in microphone characteristics or a large assembly error to the casing.

Second Embodiment

Since the distance d2 between the loudspeaker 102 and the second microphone 106 is shorter than the distance d1 between the loudspeaker 102 and the first microphone 104, reproduction sound obtained by emitting a received sound signal from the loudspeaker 102 is picked up by the second microphone 106 and the first microphone 104 in this order. Echo cancellation performance can be further enhanced by considering the gap in sound pick-up timing. A second embodiment considering a gap in sound pick-up timing is described below.

Figure 4:
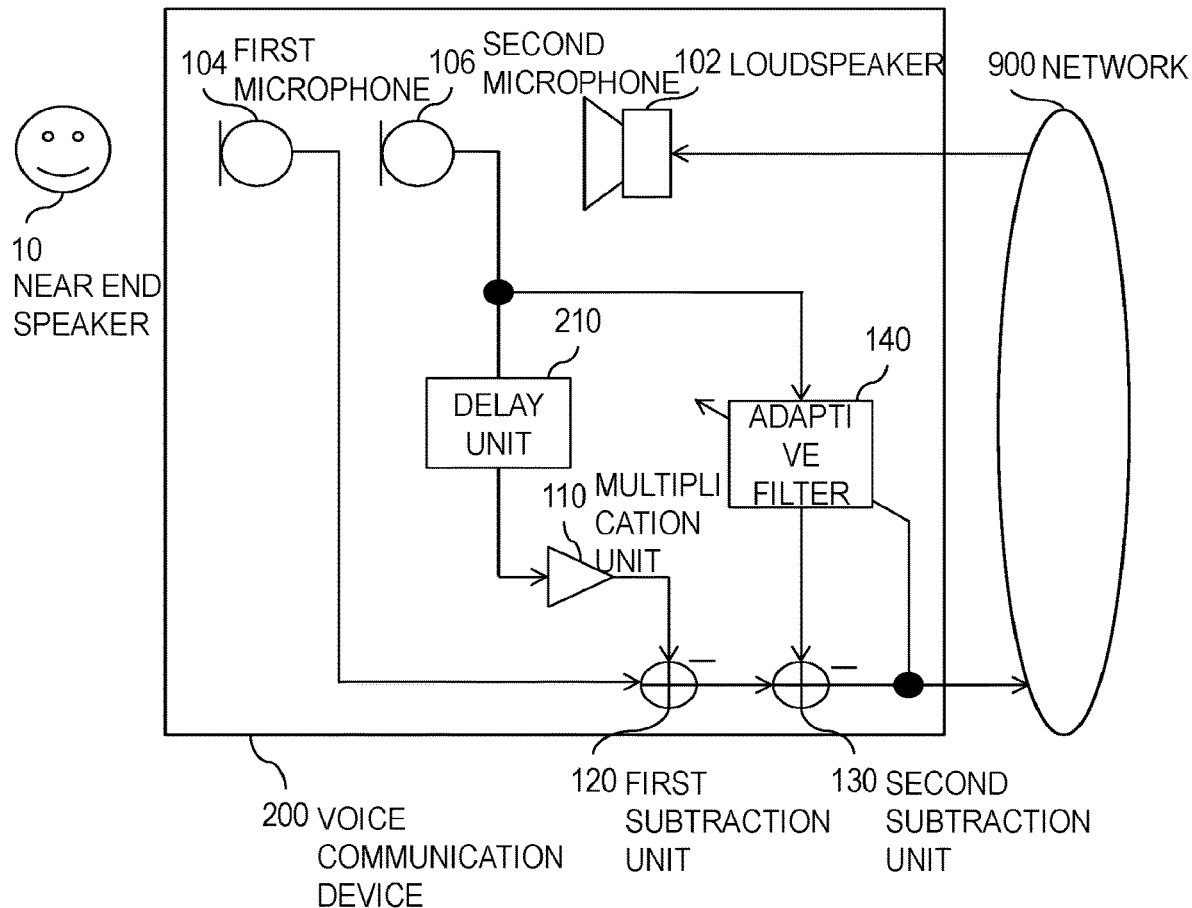
FIG. 4 is a block diagram illustrating an example of a configuration of a voice communication device 200.
Figure 5:
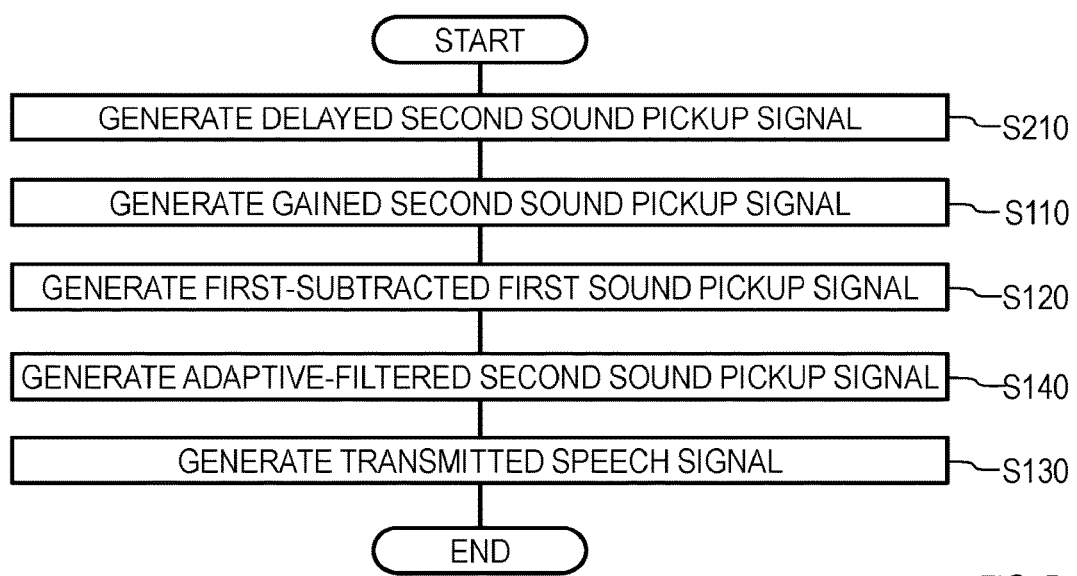
FIG. 5 is a flowchart illustrating an example of an operation of the voice communication device 200.

A voice communication device 200 is described below with reference to FIG. 4 and FIG. 5. FIG. 4 is a block diagram illustrating the configuration of the voice communication device 200. FIG. 5 is a flowchart illustrating an operation of the voice communication device 200. As illustrated in FIG. 4, the voice communication device 200 includes a loudspeaker 102, a first microphone 104, a second microphone 106, a delay unit 210, a multiplication unit 110, a first subtraction unit 120, a second subtraction unit 130, and an adaptive filter 140. That is, the voice communication device 200 is different from the voice communication device 100 in that the voice communication device 200 further includes the delay unit 210.

An operation of the voice communication device 200 is described below with reference to FIG. 5. The delay unit 210 generates a signal by adding predetermined delay to a second sound pickup signal (referred to below as a delayed second sound pickup signal) (S210). A determination method for delay time is described later.

The multiplication unit 110 generates a gained second sound pickup signal by multiplying the delayed second sound pickup signal by a predetermined fixed coefficient (S110). The first subtraction unit 120 generates a first-subtracted first sound pickup signal by subtracting the gained second sound pickup signal from a first sound pickup signal (S120). The adaptive filter 140 generates an adaptive-filtered second sound pickup signal by canceling echo which varies over time, from the second sound pickup signal and a transmitted speech signal (S140). The second subtraction unit 130 generates a transmitted speech signal by subtracting the adaptive-filtered second sound pickup signal from the first-subtracted first sound pickup signal (S130).

Delay Time

Delay time to be added by the delay unit 210 is now described. Time τ may be set as delay time, the time τ being taken when sound travels the distance d1-d2 corresponding to the difference between the distance d1 from the loudspeaker 102 to the first microphone 104 and the distance d2 from the loudspeaker 102 to the second microphone 106.

$$\tau = (d1-d2)/v \quad (2)$$

Here, v denotes sound velocity.

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

The embodiment of the present invention considers a gap in sound pick-up timing generated by a positional relation among a loudspeaker and microphones, so that echo cancellation performance can be further enhanced.

Third Embodiment

The delay unit 210 and the multiplication unit 110 in the second embodiment can consider a gap in sound pick-up timing between the first microphone 104 and the second microphone 106 (delay time difference) and an amplitude difference of sound pickup signals, but cannot consider a difference in frequency characteristics between the first microphone 104 and the second microphone 106. Therefore, a third embodiment describes the configuration using a fixed filter which is also capable of handling a difference in frequency characteristics between the first microphone 104 and the second microphone 106.

Figure 6:
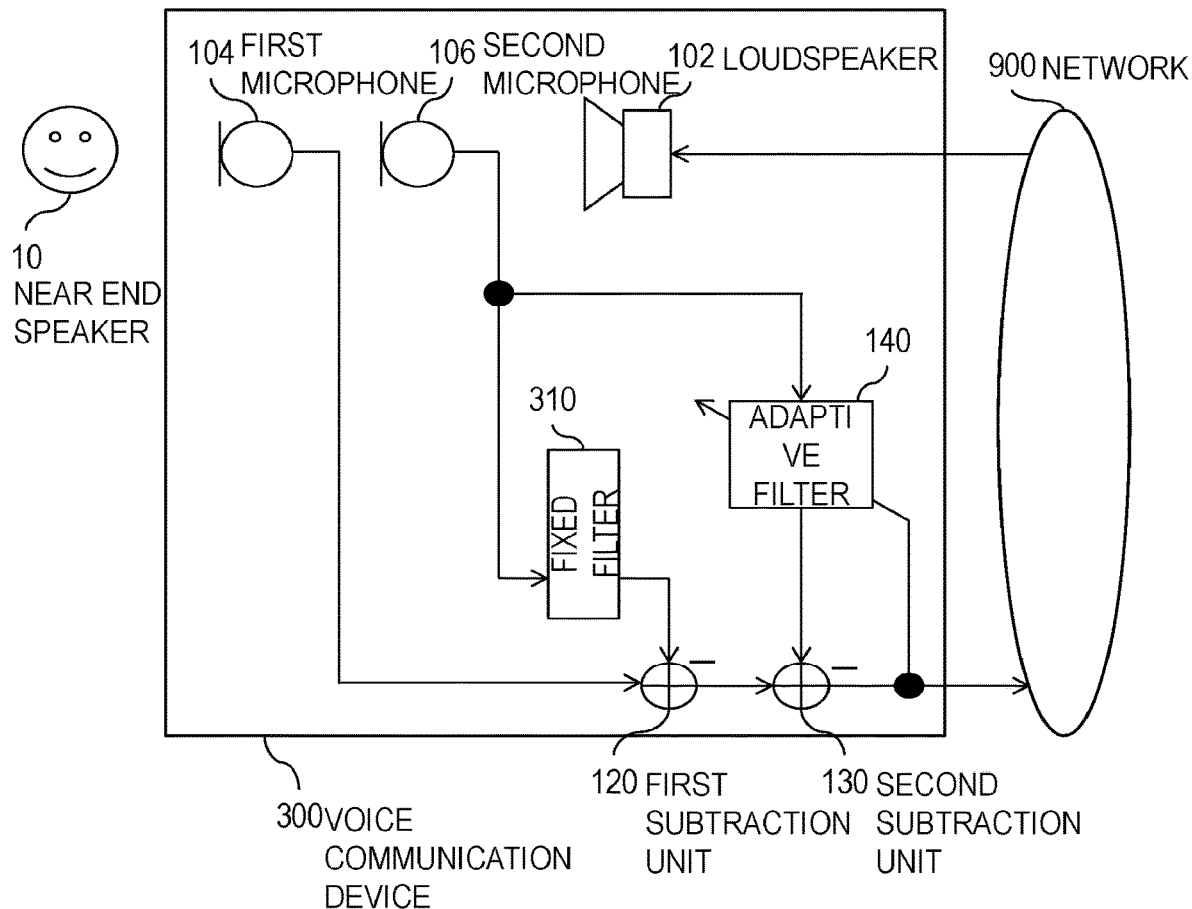
FIG. 6 is a block diagram illustrating an example of a configuration of a voice communication device 300.
Figure 7:
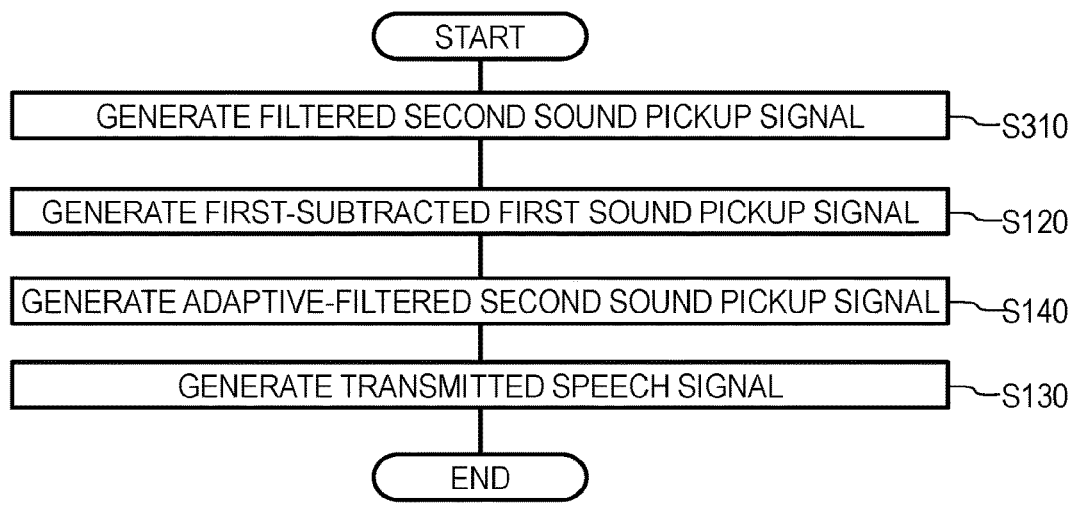
FIG. 7 is a flowchart illustrating an example of an operation of the voice communication device 300.

A voice communication device 300 is described below with reference to FIG. 6 and FIG. 7. FIG. 6 is a block diagram illustrating the configuration of the voice communication device 300. FIG. 7 is a flowchart illustrating an operation of the voice communication device 300. As illustrated in FIG. 6, the voice communication device 300 includes a loudspeaker 102, a first microphone 104, a second microphone 106, a fixed filter 310, a first subtraction unit 120, a second subtraction unit 130, and an adaptive filter 140. That is, the voice communication device 300 is different from the voice communication device 200 in that the voice communication device 300 includes the fixed filter 310 instead of the delay unit 210 and the multiplication unit 110.

An operation of the voice communication device 300 is described below with reference to FIG. 7. The fixed filter 310 generates a filtered second sound pickup signal by performing predetermined filtering with respect to a second sound pickup signal (S310). A finite impulse response (FIR) filter, for example, may be used as the fixed filter 310. Setting of the fixed filter 310 is described below. It is considered that variation in sound radiation characteristics of the loudspeaker 102 and microphone characteristics generates a difference in frequency characteristics of direct sound components of echo reaching the first microphone 104 and the second microphone 106. Therefore, a delay time difference, an amplitude difference, a frequency characteristic difference between the first microphone 104 and the second microphone 106 are obtained through experiments and simulations and these differences are set in the fixed filter 310.

The first subtraction unit 120 generates a first-subtracted first sound pickup signal by subtracting the filtered second sound pickup signal from a first sound pickup signal (S120). The adaptive filter 140 generates an adaptive-filtered second sound pickup signal by canceling echo which varies over time, from the second sound pickup signal and a transmitted speech signal (S140). The second subtraction unit 130 generates a transmitted speech signal by subtracting the adaptive-filtered second sound pickup signal from the first-subtracted first sound pickup signal (S130).

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

The embodiment of the present invention also considers a frequency characteristic difference of microphones at the fixed filter, estimation accuracy in echo direct sound components is enhanced compared to the first embodiment and the second embodiment, and echo cancellation performance can be thus enhanced.

Fourth Embodiment

A filtered second sound pickup signal is subtracted from a first sound pickup signal in the third embodiment. However, this causes deterioration in a frequency characteristic of voice of a near end speaker which is target sound. This deterioration is increased as the distance d1 between the loudspeaker 102 and the first microphone 104 is nearer to the distance d2 between the loudspeaker 102 and the second microphone 106. A fourth embodiment describes the configuration to which a fixed filter for correcting such deterioration of a frequency characteristic is added.

Figure 8:
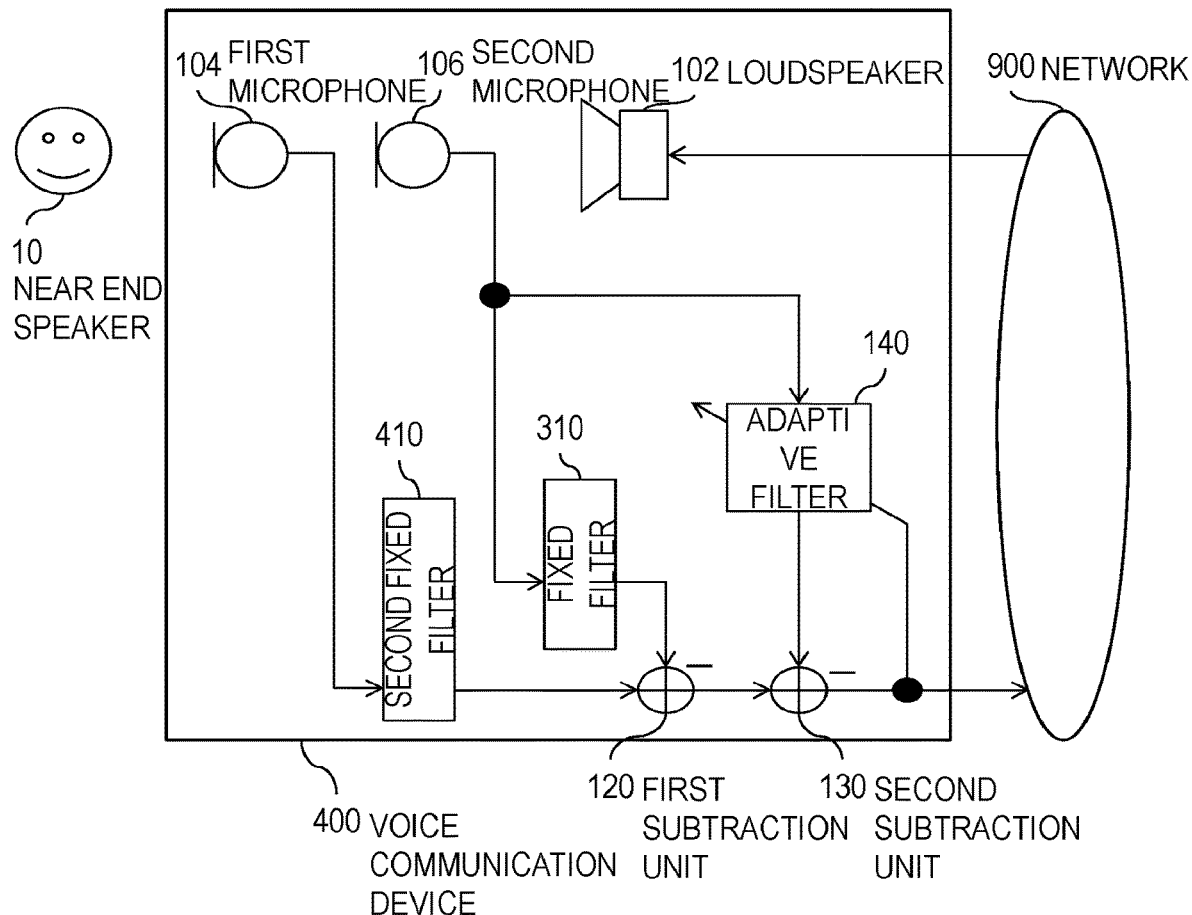
FIG. 8 is a block diagram illustrating an example of a configuration of a voice communication device 400.
Figure 9:
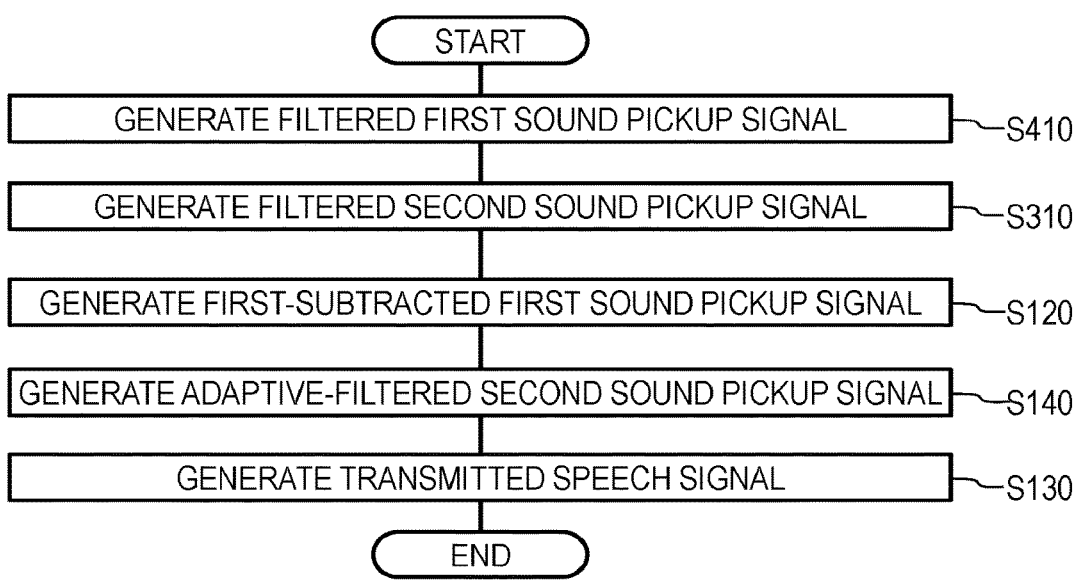
FIG. 9 is a flowchart illustrating an example of an operation of the voice communication device 400.

A voice communication device 400 is described below with reference to FIG. 8 and FIG. 9. FIG. 8 is a block diagram illustrating the configuration of the voice communication device 400. FIG. 9 is a flowchart illustrating an operation of the voice communication device 400. As illustrated in FIG. 8, the voice communication device 400 includes a loudspeaker 102, a first microphone 104, a second microphone 106, a fixed filter 310, a second fixed filter 410, a first subtraction unit 120, a second subtraction unit 130, and an adaptive filter 140. That is, the voice communication device 400 is different from the voice communication device 300 in that the voice communication device 400 further includes the second fixed filter 410.

An operation of the voice communication device 400 is described below with reference to FIG. 9. The second fixed filter 410 generates a filtered first sound pickup signal by performing predetermined filtering with respect to a first sound pickup signal (S410). A finite impulse response (FIR) filter, for example, may be used as the second fixed filter 410.

The fixed filter 310 generates a filtered second sound pickup signal by performing predetermined filtering with respect to a second sound pickup signal (S310). The first subtraction unit 120 generates a first-subtracted first sound pickup signal by subtracting the filtered second sound pickup signal from the filtered first sound pickup signal (S120). The adaptive filter 140 generates an adaptive-filtered second sound pickup signal by canceling echo which varies over time, from the second sound pickup signal and a transmitted speech signal (S140). The second subtraction unit 130 generates a transmitted speech signal by subtracting the adaptive-filtered second sound pickup signal from the first-subtracted first sound pickup signal (S130).

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

In the embodiment of the present invention, a first sound pickup signal is subjected to predetermined filtering to be corrected, being able to suppress deterioration in a frequency characteristic of voice of a near end speaker which is target sound.

Fifth Embodiment

Echo cancellation is performed by using the adaptive filter 140 using a second sound pickup signal as an input in each of the embodiments described thus far. Here, the configuration to which a second adaptive filter using a received speech signal as an input is added is described as a fifth embodiment. The configuration obtained by adding a second adaptive filter to the fourth embodiment is described here, but the configuration obtained by adding the adaptive filter to any of the first embodiment to the third embodiment instead of the fourth embodiment may be employed.

Figure 10:
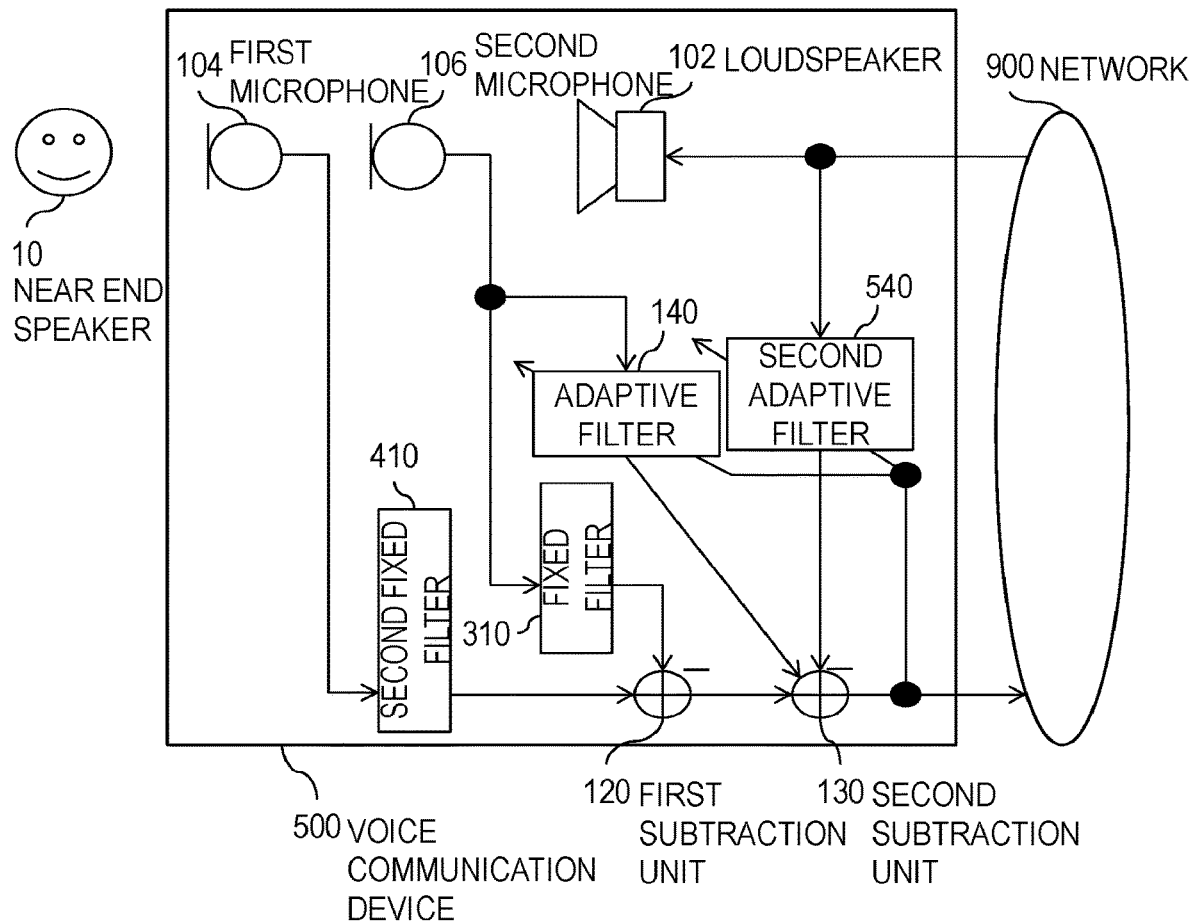
FIG. 10 is a block diagram illustrating an example of a configuration of a voice communication device 500.
Figure 11:
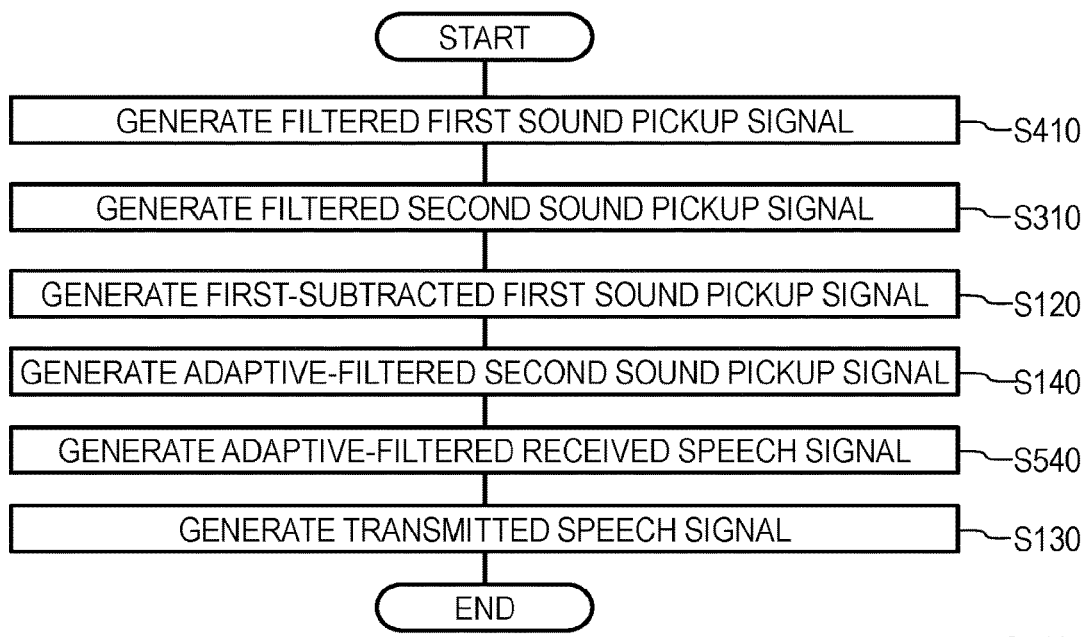
FIG. 11 is a flowchart illustrating an example of an operation of the voice communication device 500.

A voice communication device 500 is described below with reference to FIG. 10 and FIG. 11. FIG. 10 is a block diagram illustrating the configuration of the voice communication device 500. FIG. 11 is a flowchart illustrating an operation of the voice communication device 500. As illustrated in FIG. 10, the voice communication device 500 includes a loudspeaker 102, a first microphone 104, a second microphone 106, a fixed filter 310, a second fixed filter 410, a first subtraction unit 120, a second subtraction unit 130, an adaptive filter 140, and a second adaptive filter 540. That is, the voice communication device 500 is different from the voice communication device 400 in that the voice communication device 500 further includes the second adaptive filter 540.

An operation of the voice communication device 500 is described below with reference to FIG. 11. The second fixed filter 410 generates a filtered first sound pickup signal by performing predetermined filtering with respect to a first sound pickup signal (S410). The fixed filter 310 generates a filtered second sound pickup signal by performing predetermined filtering with respect to a second sound pickup signal (S310). The first subtraction unit 120 generates a first-subtracted first sound pickup signal by subtracting the filtered second sound pickup signal from the filtered first sound pickup signal (S120). The adaptive filter 140 generates an adaptive-filtered second sound pickup signal by canceling echo which varies over time, from the second sound pickup signal and a transmitted speech signal (S140).

The second adaptive filter 540 generates an adaptive-filtered received speech signal by canceling echo which varies over time, from a received speech signal and the transmitted speech signal (S540). In other words, the second adaptive filter 540 generates an adaptive-filtered received speech signal, which is obtained by canceling echo from the transmitted speech signal, by using the received speech signal as an input.

The second subtraction unit 130 generates a signal as a transmitted speech signal by subtracting the adaptive-filtered second sound pickup signal and the adaptive-filtered received speech signal from the first-subtracted first sound pickup signal (S130).

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

In the embodiment of the present invention, the adaptive filter using a received speech signal as an input is added, being able to further cancel residual loudspeaker sound and enhancing echo cancellation performance.

Sixth Embodiment

Figure 12:
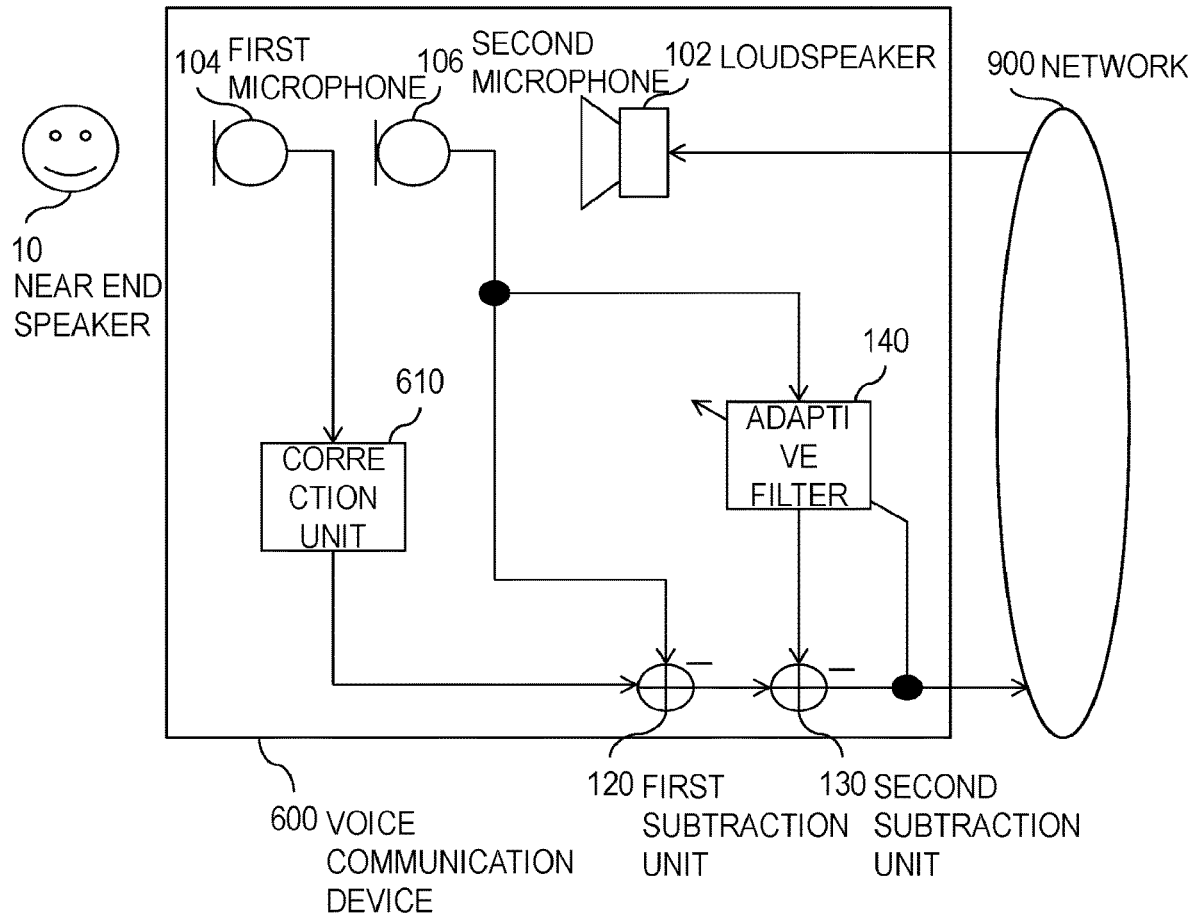
FIG. 12 is a block diagram illustrating an example of a configuration of a voice communication device 600.
Figure 13:
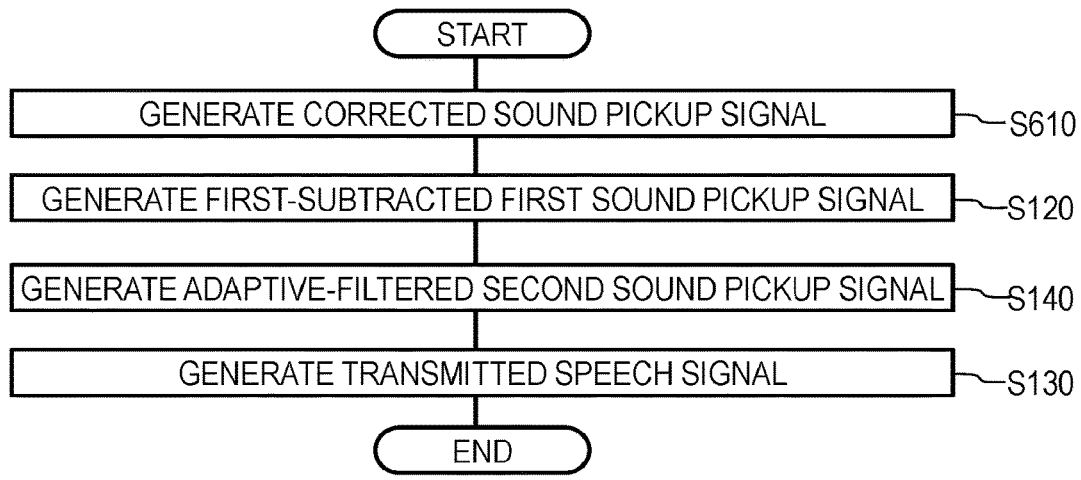
FIG. 13 is a flowchart illustrating an example of an operation of the voice communication device 600.

A voice communication device 600 is described below with reference to FIG. 12 and FIG. 13. FIG. 12 is a block diagram illustrating the configuration of the voice communication device 600. FIG. 13 is a flowchart illustrating an operation of the voice communication device 600. As illustrated in FIG. 12, the voice communication device 600 includes a loudspeaker 102, a first microphone 104, a second microphone 106, a correction unit 610, a first subtraction unit 120, a second subtraction unit 130, and an adaptive filter 140. That is, the voice communication device 600 is different from the voice communication device 100 in that the voice communication device 600 includes the correction unit 610 instead of the multiplication unit 110.

An operation of the voice communication device 600 is described below with reference to FIG. 13. The correction unit 610 generates a corrected sound pickup signal which is a signal obtained by correcting an amplitude difference based on a difference between the distance d1 from the loudspeaker 102 to the first microphone 104 and the distance d2 from the loudspeaker 102 to the second microphone 106, from a first sound pickup signal (S610). A degree of correction may be determined in the light of Formula (1) described in [Fixed coefficient] of the first embodiment, for example.

The first subtraction unit 120 generates a first-subtracted first sound pickup signal by subtracting a second sound pickup signal from the corrected sound pickup signal generated in S610 (S120). The adaptive filter 140 generates an adaptive-filtered second sound pickup signal by canceling echo which varies over time, from the second sound pickup signal and a transmitted speech signal (S140). The second subtraction unit 130 generates a transmitted speech signal by subtracting the adaptive-filtered second sound pickup signal from the first-subtracted first sound pickup signal (S130).

Modification

The voice communication device 600 is configured to correct a first sound pickup signal, but may be configured to correct a second sound pickup signal. A voice communication device 601 having such a configuration is described.

Figure 14:
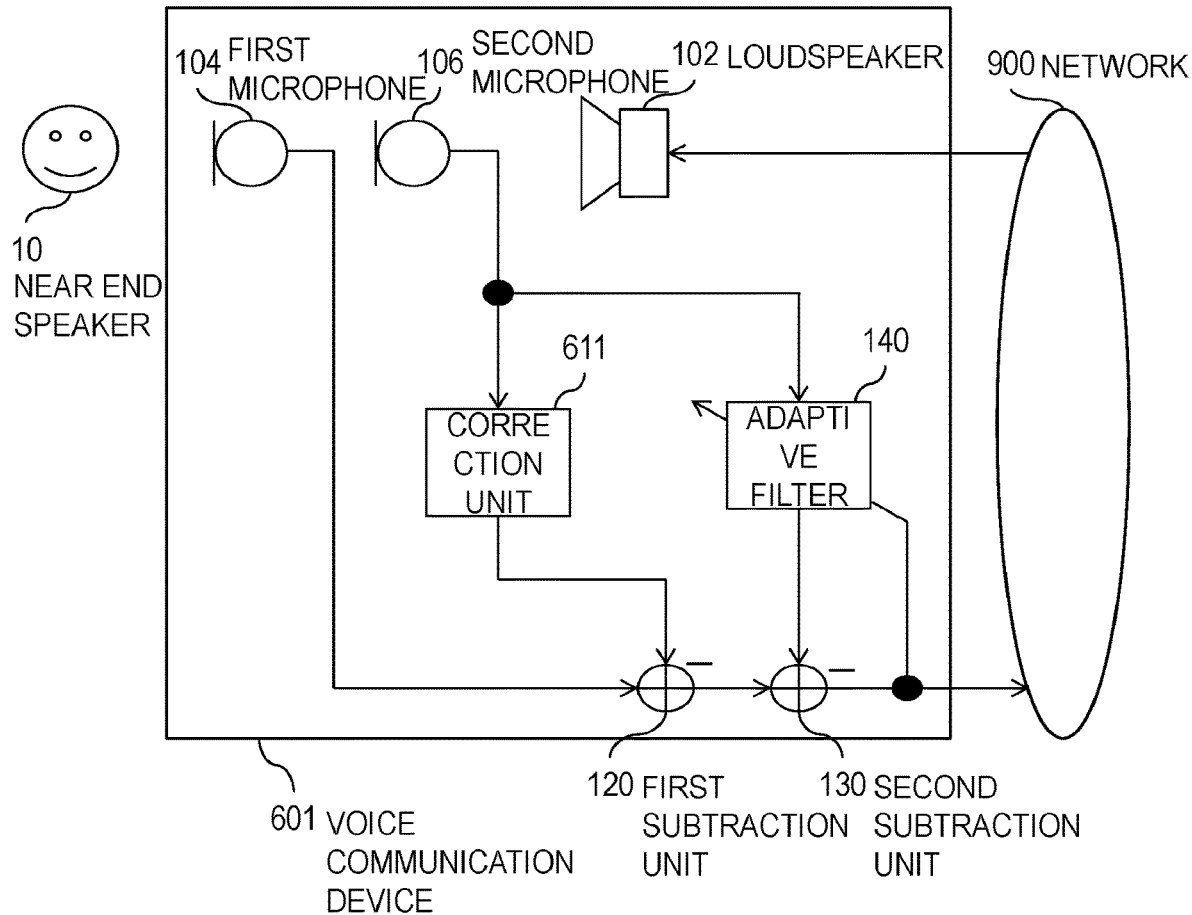
FIG. 14 is a block diagram illustrating an example of a configuration of a voice communication device 601.
Figure 15:
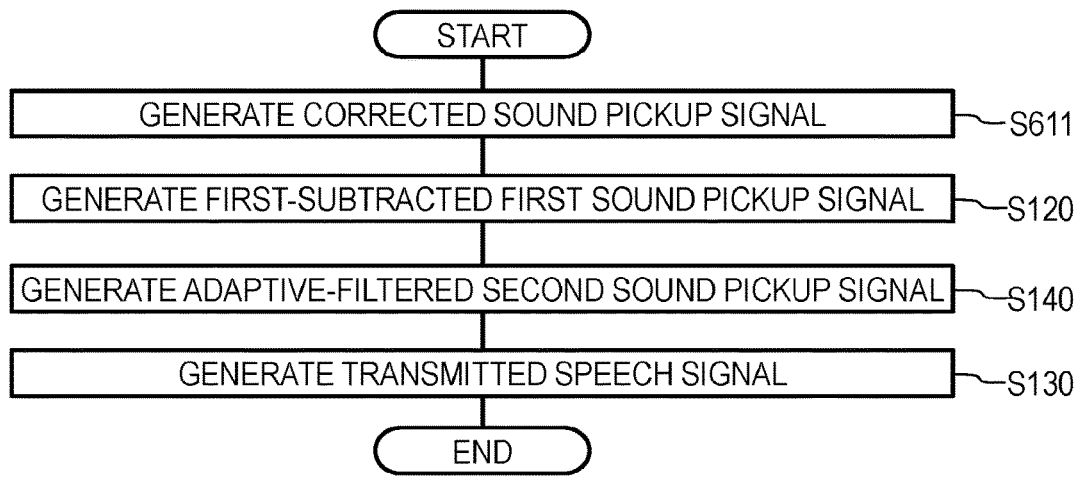
FIG. 15 is a flowchart illustrating an example of an operation of the voice communication device 601.
Figure 16:
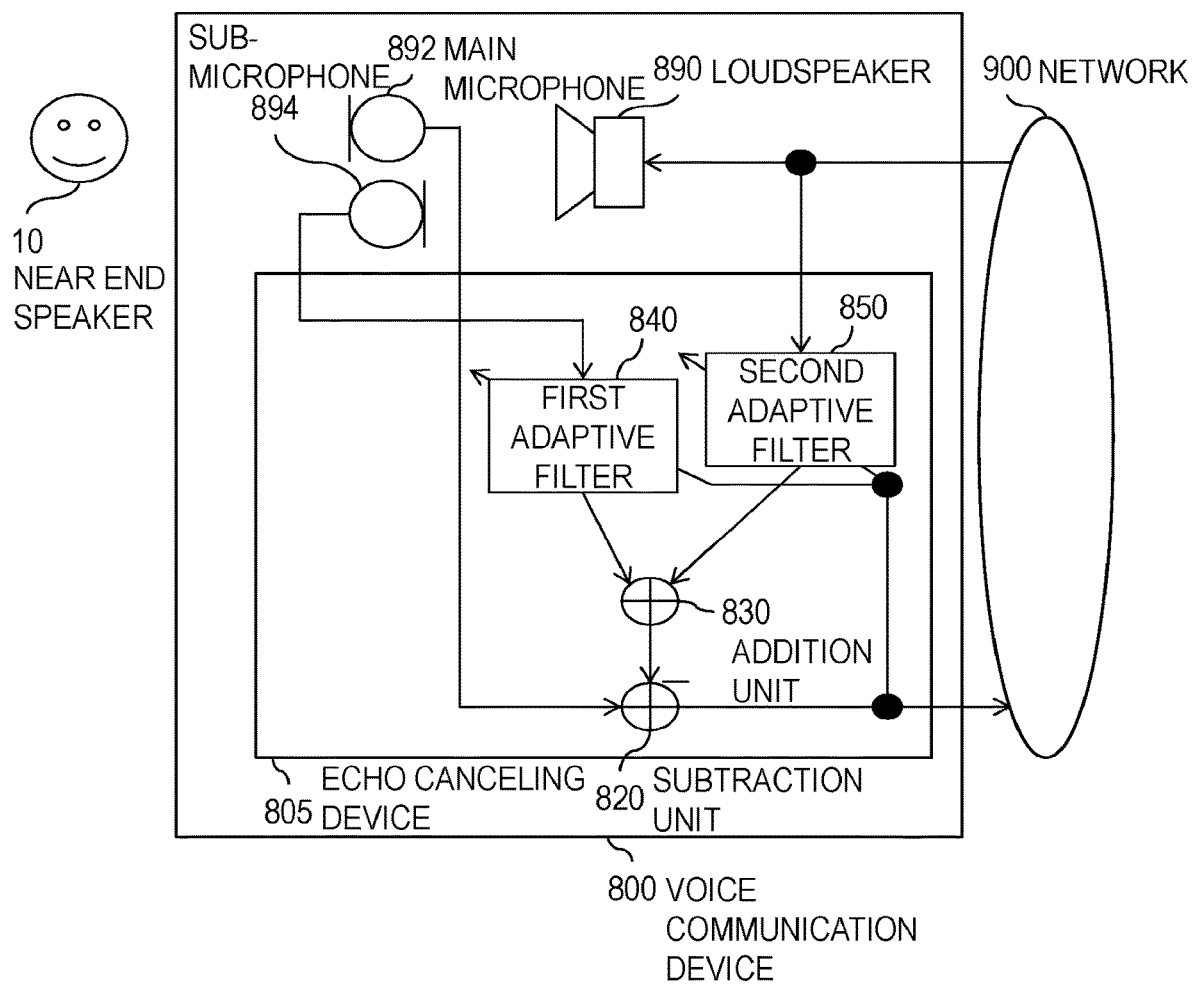
FIG. 16 is a block diagram illustrating an example of a configuration of a voice communication device 800.

A voice communication device 601 is described below with reference to FIG. 14 and FIG. 15. FIG. 14 is a block diagram illustrating the configuration of the voice communication device 601. FIG. 15 is a flowchart illustrating an operation of the voice communication device 601. As illustrated in FIG. 14, the voice communication device 601 includes a loudspeaker 102, a first microphone 104, a second microphone 106, a correction unit 611, a first subtraction unit 120, a second subtraction unit 130, and an adaptive filter 140. That is, the voice communication device 601 is different from the voice communication device 600 in that the voice communication device 601 includes the correction unit 611 instead of the correction unit 610.

An operation of the voice communication device 601 is described below with reference to FIG. 15. The correction unit 611 generates a corrected sound pickup signal which is a signal obtained by correcting an amplitude difference based on a difference between the distance d1 from the loudspeaker 102 to the first microphone 104 and the distance d2 from the loudspeaker 102 to the second microphone 106, from a second sound pickup signal (S611). A degree of correction may be determined in the light of Formula (1) described in [Fixed coefficient] of the first embodiment, for example.

The first subtraction unit 120 generates a first-subtracted first sound pickup signal by subtracting the corrected sound pickup signal generated in S611 from a first sound pickup signal (S120). The adaptive filter 140 generates an adaptive-filtered second sound pickup signal by canceling echo which varies over time, from the second sound pickup signal and a transmitted speech signal (S140). The second subtraction unit 130 generates a transmitted speech signal by subtracting the adaptive-filtered second sound pickup signal from the first-subtracted first sound pickup signal (S130).

The embodiment of the present invention enables voice communication in which superior echo cancellation is realized even in use of non-directional microphones. Especially, even in a small-sized voice communication device having large distortion in loudspeaker sound, superior echo cancellation can be realized with inexpensive non-directional microphones.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

As already mentioned, when the processing functions of the hardware entities described in the embodiments (the devices of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A voice communication device comprising:
   a loudspeaker that emits a received speech signal, the received speech signal being a voice signal of a far end speaker;
   a first microphone that picks up an acoustic signal as a first sound pickup signal, the acoustic signal containing speaker's voice which is a voice uttered by a near end speaker and a reproduction sound which is obtained by emitting the received speech signal;
   a second microphone that picks up an acoustic signal as a second sound pickup signal, the acoustic signal containing the speaker's voice and the reproduction sound;
   a correction unit that generates a corrected sound pickup signal, the corrected sound pickup signal being a signal obtained by correcting an amplitude difference based on a difference between a distance d1 from the loudspeaker to the first microphone and a distance d2 from the loudspeaker to the second microphone (here, d2≤d1), from either one of the first sound pickup signal
and the second sound pickup signal;
a first subtraction unit that generates a first-subtracted first
sound pickup signal, the first-subtracted first sound
pickup signal being a signal obtained by subtracting the
second sound pickup signal from the corrected sound
pickup signal or a signal obtained by subtracting the
corrected sound pickup signal from the first sound
pickup signal;
an adaptive filter that generates an adaptive-filtered second sound pickup signal by canceling an echo which
varies over time without cancelling the speaker's voice
in a double-talk state based on the received speech
signal being attenuated in a transmitted speech signal,
from the second sound pickup signal and the transmitted speech signal, the transmitted speech signal being
to be transmitted to the far end speaker; and
a second subtraction unit that generates a signal being
obtained by subtracting the adaptive-filtered second
sound pickup signal from the first-subtracted first
sound pickup signal, as the transmitted speech signal.

2. A voice communication device comprising:
a loudspeaker that emits a received speech signal, the
received speech signal being a voice signal of a far end
speaker;
a first microphone that picks up an acoustic signal as a
first sound pickup signal, the acoustic signal containing
speaker's voice which is a voice uttered by a near end
speaker and a reproduction sound which is obtained by
emitting the received speech signal;
a second microphone that picks up an acoustic signal as
a second sound pickup signal, the acoustic signal
containing the speaker's voice and the reproduction
sound;
a delay unit that generates a delayed second sound pickup
signal, the delayed second sound pickup signal being a
signal obtained by adding a predetermined delay to the
second sound pickup signal;
a multiplication unit that generates a gained second sound
pickup signal, the gained second sound pickup signal
being a signal obtained by multiplying the delayed
second sound pickup signal by a predetermined fixed
coefficient;
a first subtraction unit that generates a first-subtracted first
sound pickup signal, the first-subtracted first sound
pickup signal being a signal obtained by subtracting the
gained second sound pickup signal from the first sound
pickup signal;
an adaptive filter that generates an adaptive-filtered second sound pickup signal by canceling an echo which
varies over time without cancelling the speaker's voice
in a double-talk state based on the received speech
signal being attenuated in a transmitted speech signal,
from the second sound pickup signal and the transmitted speech signal, the transmitted speech signal being
to be transmitted to the far end speaker; and
a second subtraction unit that generates a signal being
obtained by subtracting the adaptive-filtered second
sound pickup signal from the first-subtracted first
sound pickup signal, as the transmitted speech signal,
wherein
the distance d1 from the loudspeaker to the first microphone is equal to or longer than the distance d2 from
the loudspeaker to the second microphone, and
the fixed coefficient is a ratio d2/d1 between the distance
d2 and the distance d1.

3. The voice communication device according to claim 1
or 2, wherein a filter coefficient of the adaptive filter is
updated by using a normalized least mean squares (NLMS)
algorithm or a least mean squares (LMS) algorithm when a
ratio Pow1/Pow2 between power Pow1 of the transmitted
speech signal and power Pow2 of the second sound pickup
signal is within a predetermined range representing that the
ratio Pow1/Pow2 is small.

4. The voice communication device according to claim 1
or 2, wherein a filter coefficient of the adaptive filter is
updated by using a modified affine projection algorithm
when an upper limit value of a limiter function $\psi(a)$, the
limiter function $\psi(a)$ being used in the modified affine
projection algorithm, is within a predetermined range representing that the upper limit value is small.

5. The voice communication device according to claim 1
or 2, wherein a filter coefficient of the adaptive filter is
updated when a ratio Pow1/Pow2 between power Pow1 of
the transmitted speech signal and power Pow2 of the second
sound pickup signal is within a predetermined range representing that the ratio Pow1/Pow2 is small.

6. The voice communication device according to claim 5,
wherein a threshold value which is used for determining
whether or not the ratio Pow1/Pow2 is within the predetermined range is a certain real number from 0.1 to 0.5.

7. A non-transitory computer-readable storage medium
which stores a program that when executed causes a computer to function as the voice communication device according to claim 1 or 2.

8. A voice communication method, in which a voice
communication device generates a transmitted speech signal
which is to be transmitted to a far end speaker,
the voice communication device including
a loudspeaker that emits a received speech signal which
is a voice signal of the far end speaker,
a first microphone that picks up an acoustic signal as a
first sound pickup signal, the acoustic signal containing speaker's voice which is a voice uttered by a
near end speaker and a reproduction sound which is
obtained by emitting the received speech signal, and
a second microphone that picks up an acoustic signal as
a second sound pickup signal, the acoustic signal
containing the speaker's voice and the reproduction
sound,
the voice communication method comprising:
a correcting step in which the voice communication
device generates a corrected sound pickup signal, the
corrected sound pickup signal being a signal
obtained by correcting an amplitude difference based
on a difference between a distance d1 from the
loudspeaker to the first microphone and a distance d2
from the loudspeaker to the second microphone
(here, d2≤d1), from either one of the first sound
pickup signal and the second sound pickup signal;
a first subtracting step in which the voice communication device generates a first-subtracted first sound
pickup signal, the first-subtracted first sound pickup
signal being a signal obtained by subtracting the
second sound pickup signal from the corrected sound
pickup signal or a signal obtained by subtracting the
corrected sound pickup signal from the first sound
pickup signal;
an adaptive filtering step in which the voice communication device generates an adaptive-filtered second
sound pickup signal by canceling an echo which
varies over time without cancelling the speaker's
voice in a double-talk state based on the received speech signal being attenuated in a transmitted speech signal, from the second sound pickup signal and the transmitted speech signal; and a second subtracting step in which the voice communication device generates a signal being obtained by subtracting the adaptive-filtered second sound pickup signal from the first-subtracted first sound pickup signal, as the transmitted speech signal.

9. A voice communication method, in which a voice communication device generates a transmitted speech signal which is to be transmitted to a far end speaker, the voice communication device including
  a loudspeaker that emits a received speech signal which is a voice signal of the far end speaker,
  a first microphone that picks up an acoustic signal as a first sound pickup signal, the acoustic signal containing speaker's voice which is a voice uttered by a near end speaker and a reproduction sound which is obtained by emitting the received speech signal, and
  a second microphone that picks up an acoustic signal as a second sound pickup signal, the acoustic signal containing the speaker's voice and the reproduction sound, the voice communication method comprising:
  a delaying step in which the voice communication device generates a delayed second sound pickup signal, the delayed second sound pickup signal being a signal obtained by adding a predetermined delay to the second sound pickup signal;
  a multiplying step in which the voice communication device generates a gained second sound pickup signal, the gained second sound pickup signal being a signal obtained by multiplying the delayed second sound pickup signal by a predetermined fixed coefficient;
  a first subtracting step in which the voice communication device generates a first-subtracted first sound pickup signal, the first-subtracted first sound pickup signal being a signal obtained by subtracting the gained second sound pickup signal from the first sound pickup signal;
  an adaptive filtering step in which the voice communication device generates an adaptive-filtered second sound pickup signal by canceling an echo which varies over time without cancelling the speaker's voice in a double-talk state based on the received speech signal being attenuated in a transmitted speech signal, from the second sound pickup signal and the transmitted speech signal; and
  a second subtracting step in which the voice communication device generates a signal being obtained by subtracting the adaptive-filtered second sound pickup signal from the first-subtracted first sound pickup signal, as the transmitted speech signal, wherein the distance d1 from the loudspeaker to the first microphone is equal to or longer than the distance d2 from the loudspeaker to the second microphone, and the fixed coefficient is a ratio d2/d1 between the distance d2 and the distance d1.

* * * * *